(12) United States Patent
Frasier et al.

(10) Patent No.: US 9,814,173 B2
(45) Date of Patent: Nov. 14, 2017

(54) SEEDING SYSTEM

(71) Applicant: Deere & Company, Moline, IL (US)

(72) Inventors: Michael E. Frasier, Iowa City, IA (US); Scott C. McCartney, Bettendorf, IA (US)

(73) Assignee: DEERE & COMPANY, Moline, IL (US)

(*) Notice: Subject to any disclaimer, the term of this patent is extended or adjusted under 35 U.S.C. 154(b) by 38 days.

(21) Appl. No.: 14/871,653

(22) Filed: Sep. 30, 2015

(65) Prior Publication Data

US 2017/0086352 A1 Mar. 30, 2017

(51) Int. Cl.
| | | |
|---|---|---|
| *A01C 7/18* | (2006.01) | |
| *A01C 7/20* | (2006.01) | |
| *B65G 53/04* | (2006.01) | |
| *B65G 53/46* | (2006.01) | |
| *B65G 53/60* | (2006.01) | |
| *A01C 7/06* | (2006.01) | |
| *A01C 7/08* | (2006.01) | |
| *A01C 15/00* | (2006.01) | |
| *A01C 7/10* | (2006.01) | |
| *A01C 15/04* | (2006.01) | |

(52) U.S. Cl.
CPC ............... *A01C 7/06* (2013.01); *A01C 7/081* (2013.01); *A01C 7/082* (2013.01); *A01C 7/084* (2013.01); *A01C 15/00* (2013.01); *B65G 53/04* (2013.01); *B65G 53/46* (2013.01); *B65G 53/60* (2013.01); *A01C 7/102* (2013.01); *A01C 15/04* (2013.01)

(58) Field of Classification Search
CPC .. A01C 7/06; A01C 7/08; A01C 21/00; A01C 7/084; A01C 7/081; A01C 7/082; B65G 53/04; B65G 53/60
See application file for complete search history.

(56) References Cited

U.S. PATENT DOCUMENTS 4,638,748 A * 1/1987 Kopecky ................. A01C 5/06
111/124
4,779,765 A * 10/1988 Neumeyer ............... A01C 7/06
111/174
(Continued)

FOREIGN PATENT DOCUMENTS

| EP | 2196079 | 6/2010 |
|---|---|---|
| EP | 2765398 | 8/2014 |

(Continued)

OTHER PUBLICATIONS

Office Action from the US Patent and Trademark Office for U.S. Appl. No. 14/871,515 dated Jan. 27, 2017 (13 pages).
(Continued)

*Primary Examiner* — John G Weiss
(74) *Attorney, Agent, or Firm* — Michael Best & Friedrich LLP (57) ABSTRACT

A seeding system includes a storage tank operable to store a plurality of seeds and a dispersion unit configured to disperse some of the plurality of seeds amongst a plurality of conduits. The dispersion unit includes a sensor. A meter is operable to transfer the some of the plurality of seeds from the storage tank to the dispersion unit. The sensor is operable to produce a signal to control the transfer from the storage tank to the dispersion unit.

24 Claims, 4 Drawing Sheets

(56) References Cited

U.S. PATENT DOCUMENTS

| | | | |
|---|---|---|---|
| 5,351,635 A * | 10/1994 | Hulicsko | A01B 61/046 |
| | | | 111/135 |
| 5,826,523 A | 10/1998 | Gregor | |
| 6,192,813 B1 | 2/2001 | Memory et al. | |
| 6,688,244 B1 | 2/2004 | Meyer et al. | |
| 6,935,255 B2 * | 8/2005 | Hagen | A01C 15/006 |
| | | | 111/174 |
| 7,353,760 B2 | 4/2008 | Mayerle et al. | |
| 7,509,915 B2 | 3/2009 | Memory | |
| 7,555,990 B2 | 7/2009 | Beaujot | |
| 7,938,075 B1 | 5/2011 | Glendenning et al. | |
| 8,281,724 B2 | 10/2012 | Snipes et al. | |
| 8,350,689 B2 | 1/2013 | Mariman et al. | |
| 9,043,949 B2 | 6/2015 | Liu et al. | |
| 9,488,512 B2 | 11/2016 | Hossain et al. | |
| 9,596,803 B2 | 3/2017 | Wendte et al. | |
| 9,699,953 B2 | 7/2017 | Jagow et al. | |
| 2003/0133759 A1 * | 7/2003 | Winther | B65G 53/14 |
| | | | 406/138 |
| 2007/0266917 A1 | 11/2007 | Riewerts et al. | |
| 2009/0079624 A1 * | 3/2009 | Dean | A01C 7/084 |
| | | | 342/357.52 |
| 2012/0226461 A1 | 9/2012 | Kowalchuk | |
| 2014/0165890 A1 | 6/2014 | Graham | |
| 2014/0216314 A1 | 8/2014 | Bourgault et al. | |
| 2014/0311598 A1 | 10/2014 | Hui et al. | |
| 2015/0090166 A1 | 4/2015 | Allgaier et al. | |
| 2015/0223392 A1 * | 8/2015 | Wilhelmi | A01C 7/20 |
| | | | 111/171 |
| 2016/0037713 A1 * | 2/2016 | Wendte | A01C 21/005 |
| | | | 111/177 |
| 2016/0095274 A1 * | 4/2016 | Wendte | A01C 21/005 |
| | | | 111/177 |
| 2016/0120107 A1 | 5/2016 | Chahley et al. | |
| 2016/0121284 A1 | 5/2016 | Roberge et al. | |
| 2016/0135359 A1 | 5/2016 | Kowalchuk et al. | |
| 2016/0157417 A1 * | 6/2016 | Funck | A01C 7/04 |
| | | | 111/174 |
| 2016/0234996 A1 * | 8/2016 | Sauder | A01C 21/005 |
| 2016/0295792 A1 | 10/2016 | Secrest et al. | |
| 2016/0302353 A1 * | 10/2016 | Wendte | A01C 21/005 |
| 2017/0086351 A1 | 3/2017 | Garner et al. | |
| 2017/0086355 A1 | 3/2017 | Borkgren et al. | |
| 2017/0086356 A1 | 3/2017 | Schweitzer et al. | |

FOREIGN PATENT DOCUMENTS

| | | |
|---|---|---|
| EP | 3000299 | 3/2016 |
| FR | 2973790 | 10/2012 |
| WO | 2015094108 | 6/2015 |

OTHER PUBLICATIONS

Office Action from the US Patent and Trademark Office for U.S. Appl. No. 14/871,633 dated Jan. 19, 2017 (13 pages).
Office Action from the US Patent and Trademark Office for U.S. Appl. No. 14/871,515 dated May 10, 2017 (5 pages).
Office Action from the US Patent and Trademark Office for U.S. Appl. No. 14/871,633 dated Jul. 6, 2017 (14 pages).

* cited by examiner

SEEDING SYSTEM

BACKGROUND

The present disclosure relates to a seeding and planting system and more particularly to a metering and distribution system of the seeding and planting system.

SUMMARY

Current seeding practices tend to involve one of two types of seeding systems: planters and air seeders. Planters generally singulate or individually meter seeds prior to planting and are typically used to disperse seeds where precise placement is required for maximum yield and the seeding rate permits use of singulating technologies. Air seeders generally meter seeds volumetrically and are typically used in high rate seeding applications and where precise seed placement is of less importance or not practical due to the high rates.

A seeding system includes a storage tank operable to store a plurality of seeds and a dispersion unit configured to disperse some of the plurality of seeds amongst a plurality of conduits. The dispersion unit includes a sensor. A meter is operable to transfer the some of the plurality of seeds from the storage tank to the dispersion unit. The sensor is operable to produce a signal to control the transfer from the storage tank to the dispersion unit.

A seeding system includes a dispersion unit configured to disperse a plurality of seeds amongst a plurality of seed conduits. The dispersion unit comprises a container having an inlet for the plurality of seeds and an air current, at least one seed outlet, and an air outlet distinct from the at least one seed outlet. A single fan is located upstream of the inlet of the dispersion unit and operable to provide the air current to the inlet of the dispersion unit.

A seeding system includes a first storage tank for holding a plurality of seeds and a second storage tank for holding a quantity of fertilizer. A plurality of singulating meters are each operable to meter some of the plurality of seeds from the first storage tank. A first path is operable to deliver a first portion of the plurality of seeds from the first storage tank to one of the plurality of singulating meters via a first dispersion unit. The first dispersion unit includes a sensor configured to sense a relative quantity of seed within the first dispersion unit. A second path is operable to deliver a portion of the quantity of fertilizer from the second storage tank to the ground via a second dispersion unit. The second path is configured to bypass the one of the plurality of singulating meters.

A seeding system comprises a first storage tank for holding a plurality of seeds and a second storage tank for holding a quantity of fertilizer. A plurality of singulating meters are each operable to meter some of the plurality of seeds from the first storage tank. A first path is operable to deliver a first portion of the plurality of seeds from the first storage tank to a point downstream of a second dispersion unit. A second path is operable to deliver a portion of the quantity of fertilizer from the second storage tank to the ground via the second dispersion unit. The first path is in communication with the second path at a point downstream of the second dispersion unit.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
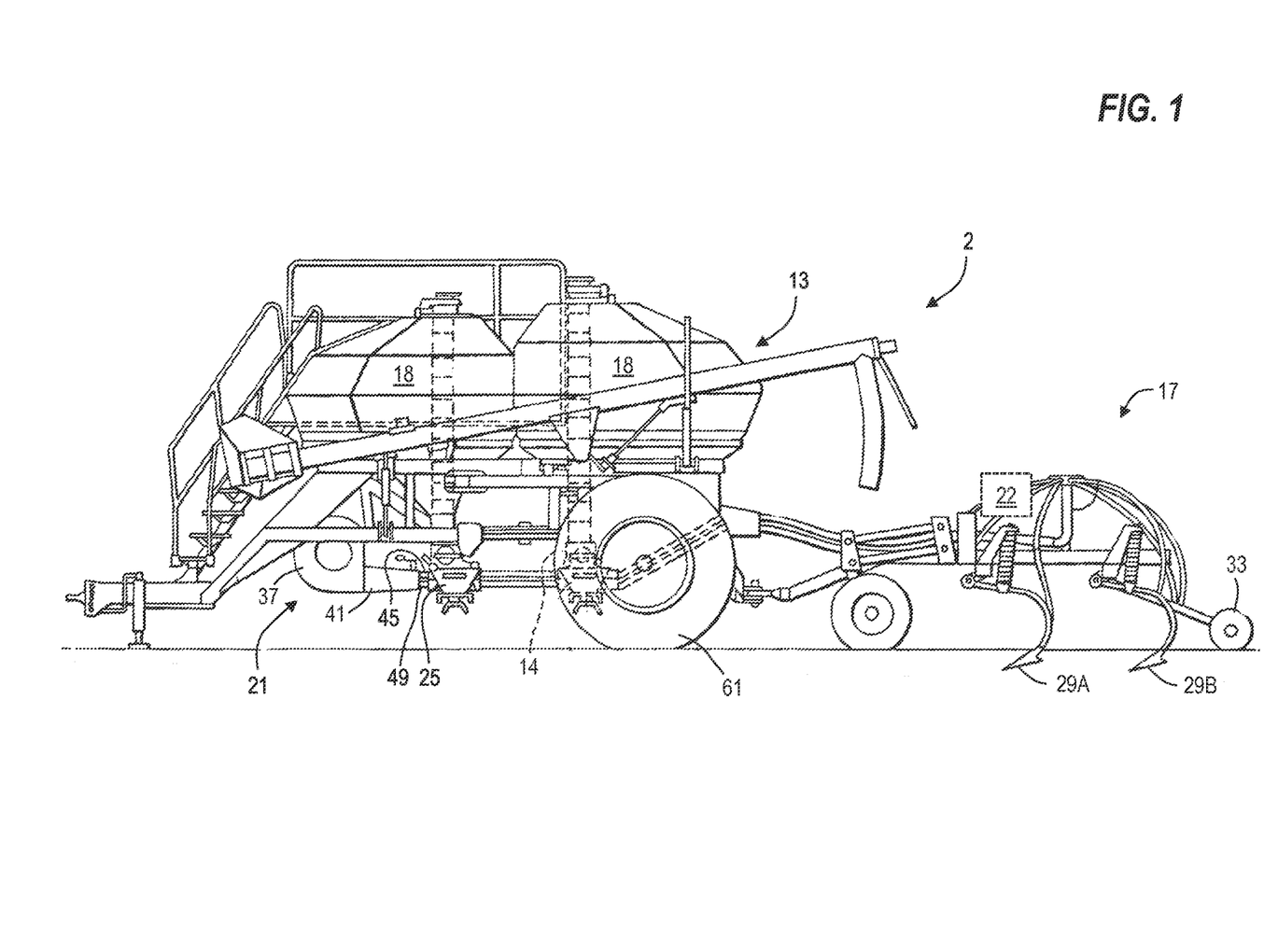
FIG. 1 is a side view of a seeder.

As shown in FIG. 1, seeding machine 2 comprises a seed cart 13 and a tilling implement 17. The seed cart 13 is typically towed by a tractor through a field to be seeded. The seed cart 13 has a frame supporting a number of storage tanks 18 with wheels 61 rotatably mounted to the frame. The product contained in the storage tanks 18 may include seed, fertilizer, or other agricultural particles. Each storage tank 18 is provided with a volumetric meter 14. Each volumetric meter 14 is positioned below the respective storage tank 18 and receives product therefrom for controlled feeding of the product into a pneumatic distribution system 21.

The tilling implement 17, towed behind the seed cart 13, comprises a frame to which ground openers 29A, 29B are mounted. The tilling implement 17 may also include seed row finishing equipment such as packers 33. Located below each volumetric meter 14 is a primary air distribution manifold 25, part of the pneumatic distribution system 21. The pneumatic distribution system 21 distributes metered product from the storage tanks 18 to the ground openers 29A, 29B and comprises a blower 37 driven by a motor which directs a stream of pressurized air through an adjustable damper 41, which thereafter directs the air stream into a top rank portion directed into an upper rank of first tubes 45 and a bottom rank portion directed into a bottom rank of first tubes 49. FIG. 1 illustrates a double shoot air seeder wherein a first product contained in one of the storage tanks 18 is directed to the top rank portion 45 of the air stream and the second product contained in the other of the storage tanks 18 is directed to the bottom rank portion 49 of the air stream. Triple shot applications in which three products are added to three different rank portions of the air stream are also utilized in certain situations, as shown in FIG. 2.

Figure 2:
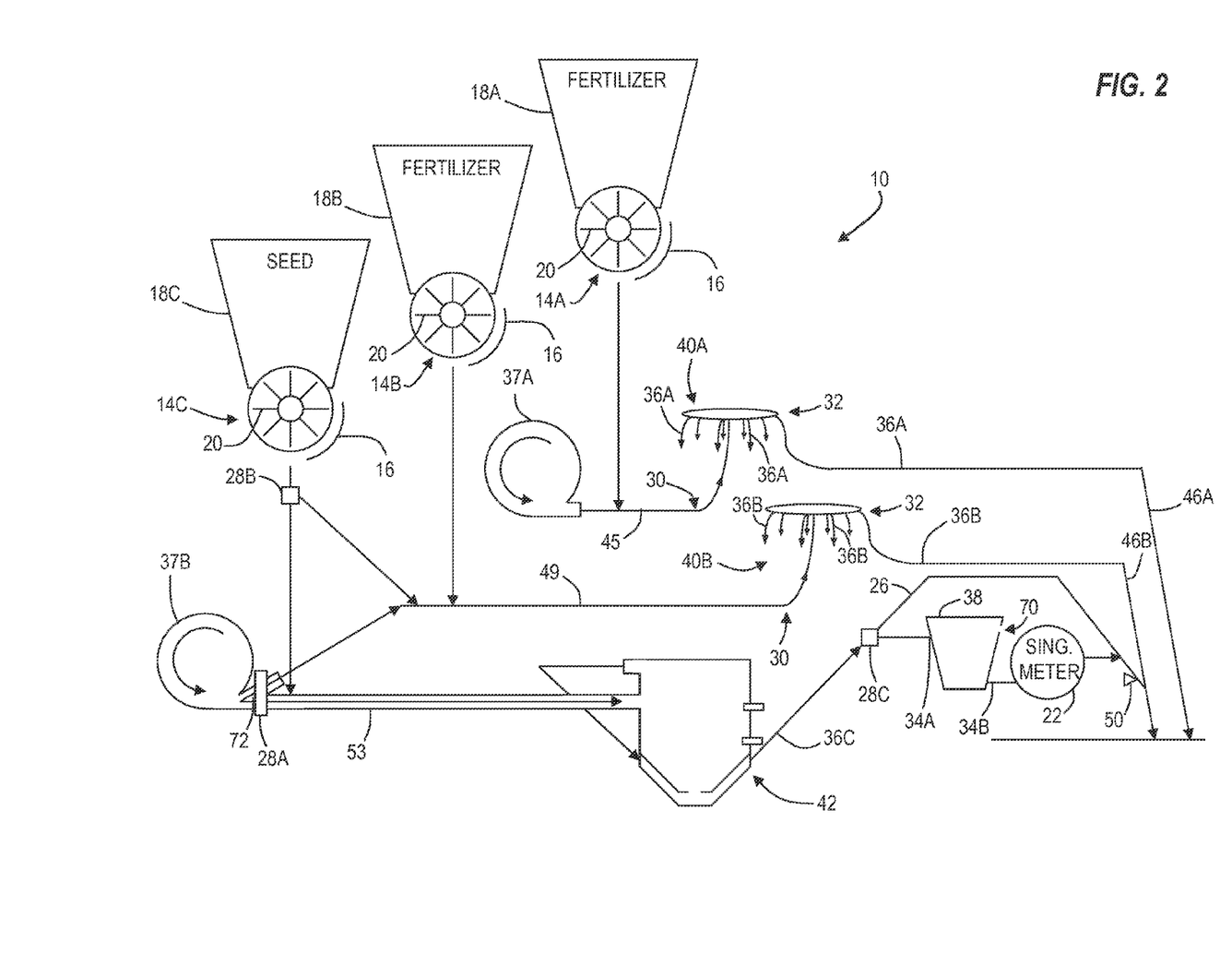
FIG. 2 is a schematic diagram illustrating a metering and distribution system.

FIG. 2 schematically illustrates a seed metering system 10 along three rank portions or main conduits 45, 49, 53 for use in a planting operation, such as seeding a field or dispersing agricultural particles (e.g., fertilizer, etc.). The seed metering system 10 can be used with or as a part of the seeding machine 2.

Each volumetric meter 14A, 14B, 14C (e.g., one volumetric meter 14A, 14B, 14C associated with each of the three storage tanks 18A, 18B, 18C, respectively) is configured to receive and meter the seeds or agricultural particles from the storage tanks 18A, 18B, 18C. The storage tanks 18A, 18B, 18C may be in the form of a tank, hopper, air cart, mobile seed storage device, or other bulk container as previously described and illustrated in FIG. 1. The volumetric meters 14A, 14B, 14C control the amount or volume of seeds or other agricultural particles permitted to exit the storage tanks 18A, 18B, 18C over a set period of time and may each include multiple roller segments or rotating members 20, each capable of rotating at a constant rotational velocity along a common shaft. The volumetric meters 14A, 14B, 14C are located upstream of and are operable to provide a known, constant volume of seeds or particles to the conduits 45, 49, 53. Gates 16 associated with each volumetric meter 14A, 14B, 14C or each roller segment 20 are operable to open or close to vary the amount of seeds or agricultural particles which reach the conduits 45, 49, 53. Alternatively, each roller segment 20 of the volumetric meters 14A, 14B, 14C may be individually driven, and therefore may be individually halted to vary the amount of seeds or agricultural particles which reach the conduits 45, 49, 53.

A fan 37A, 37B is located at one end of the conduits 45, 49, 53 and is operable to provide an air current to the corresponding conduits 45, 49, 53 and throughout the remainder of the metering system 10. As shown, the first conduit 45 utilizes a first fan 37A and the second and third conduits 49, 53 utilize a second fan 37B. Alternatively, a single fan may provide three air currents; one to each of the conduits 45, 49, 53, or individual fans may be associated with the respective conduits 45, 49, 53.

The main conduits 45, 49 terminate at distribution or dispersion units 40A, 40B, which are located between the volumetric meter 14A, 14B and the ground, where the seeds or particles are deposited. The dispersion units 40A, 40B as shown each have an inlet 30 coupled to the respective main conduit 45, 49, a collection volume, and a plurality of outlets 32, which lead to secondary conduits 36A, 36B. Each secondary conduit 36A, 36B leads to an outlet conduit 46A, 46B. As the seeds or agricultural particles from a single conduit (i.e., the conduit 45, 49) are dispersed among multiple conduits (i.e., the secondary conduits 36A, 36B), the secondary conduits 36A, 36B may be of lesser size or area than the associated conduits 45, 49.

Figure 3A:
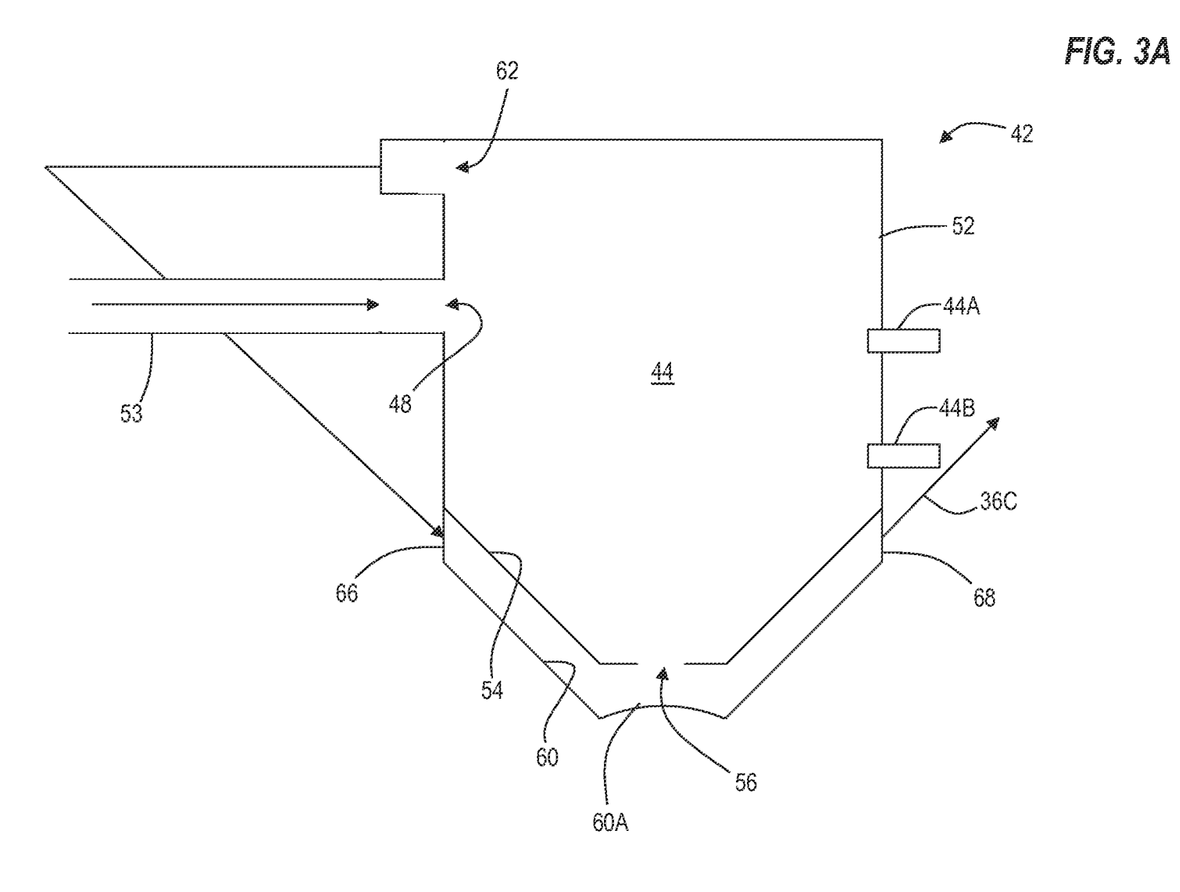
FIG. 3A is an enlarged view of a distribution unit including a seed channel, as shown in FIG. 2.

The third distribution or dispersion unit 42, enlarged in FIG. 3A, is dissimilar in design and operation to the dispersion units 40A, 40B. Dispersion unit 42 includes a container defining a central chamber 44 with an inlet 48 located along a sidewall 52 and connected to the main conduit 53. The inlet 48 accepts seeds from the volumetric meter 14C and air from the fan 37B. The base 54 of the dispersion unit 42 is generally sloped or similarly oriented to direct the seeds within the central chamber 44 by gravity towards a seed outlet or orifice 56 located at the lowermost portion of the base 54. The orifice 56 is sized to allow seeds to drop into a seed channel 60 located below the central chamber 44.

Two sensors, an upper limit sensor 44A and a lower limit sensor 44B are located within the central chamber 44. The lower limit sensor 44B is located nearer the base than the upper limit sensor 44A. The sensors are configured to communicate an aspect of the seed level, such as the relative quantity of seed within the container or chamber 44, to a control unit (not shown). The sensors 44A, 44B may be mechanical or electrical/electronic in nature and based on, for example, pressure, optics, ultrasound, etc.

Figure 3B:
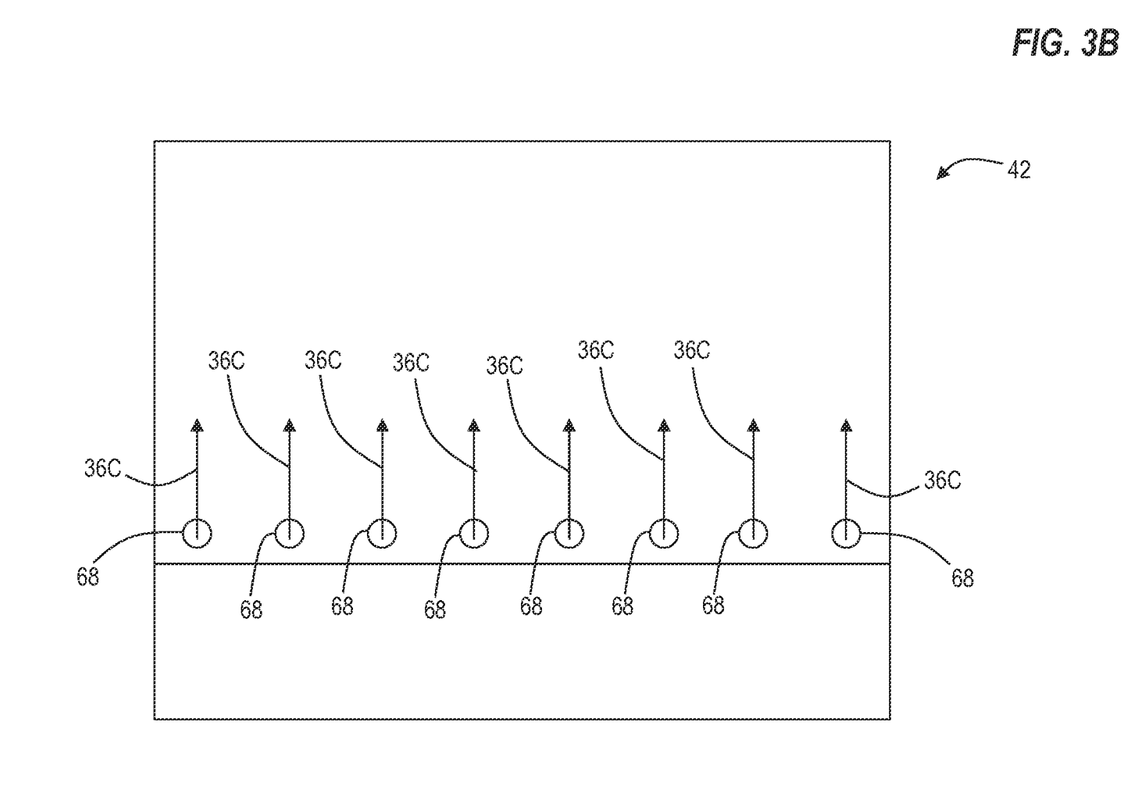
FIG. 3B is a side view of the third distribution unit showing multiple seed conduit outlets.

The third dispersion unit 42 additionally includes an air outlet 62 in communication with the central chamber 44 and located at a height above the inlet 48 such that seeds do not block the air outlet 62. The air outlet 62 links the central chamber 44 to a first end 66 of the seed channel 60. The seed channel 60 extends along the base 54 from the first end 66 towards the orifice 56 and extends in an upward direction from the orifice 56 to a second end 68, preventing gravity alone from accumulating seeds within the seed channel 60 such that seeds would approach either the first end 66 or the second end 68. The seed channel 60 may include a Venturi-type restriction 60A below the orifice 56, the restriction 60A cooperative with the air outlet 62 to create a low-pressure area within the seed channel 60. As shown in FIG. 3B, the third dispersion unit 42 may have a substantial depth (i.e., extending into the page of FIG. 3A) such that the unit 42 includes multiple orifices 56 spaced apart from one another along the base 54 and multiple seed channels 60, each with an associated second end 68. In such an embodiment, each orifice 56 corresponds to and feeds a different seed channel 60.

The second end 68 of each seed channel 60 is fixed to a secondary conduit 36C. As mentioned above, the dispersion unit 42 may include multiple orifices 56, each corresponding to a different seed channel 60. Therefore, multiple secondary conduits 36C, each associated with one of the seed channels 60, may extend from the dispersion unit 42. As an alternative to the air outlet 62, individual fans may be associated with each or a sub-group of the secondary conduits 36C.

As shown in FIG. 2, the secondary conduit 36C includes a fork, with one path leading to a container or hopper or "mini-hopper" 38, the other leading to a bypass conduit 26. The bypass conduit 26 is operable to bypass or circumnavigate the mini-hopper and connects the third secondary conduit 36C to the second secondary conduit 36B at the outlet conduit 46B.

Referring again to FIG. 2, the mini-hopper 38 selectively receives seeds from the third dispersion unit 42 via the secondary conduit 36C. The mini-hopper 38 is located directly upstream of a singulating meter 22 and feeds the seeds from the secondary conduit 36C into the meter 22. The mini-hopper 38 is additionally capable of storing excess seeds, not yet metered by the singulating meter 22. Therefore, the seeds may pass through the volumetric meter 14C at a greater rate than the seeds are singulated along this particular path. This ensures that the singulating meter 22 is consistently stocked with seeds for singulating and subsequently planting. The mini-hopper 38 may be gravity-assisted, with an inlet 34A from the secondary conduit 36C located at a height above the outlet 34B to the singulating meter 22.

At the height of the inlet 34A or at a height between the inlet 34A and the outlet 34B, the mini-hopper 38 is provided with one or more openings 70. The openings 70 are sized smaller than the seeds such that seeds are not capable of traversing the openings 70. When not blocked by seeds, the openings 70 serve as an outlet for the air from the fan 37B through the conduit 36C.

The singulating meter 22 is operable to singulate or individually meter seeds and is in communication with the mini-hopper 38 via the mini-hopper outlet 34B. The singulating meter 22 may include a rotating singulating disk (not shown) with multiple orifices, each sized to accept a single seed, and a doubles eliminator (not shown) provided to ensure a one-to-one ratio of seed to each aperture.

At an outlet end, the singulating meter 22 is connected to the conduit 46B. A seed sensor 50 is positioned within a shared conduit downstream of the location where the outlet end of the singulating meter 22 meets the bypass conduit 26 and upstream of the connection to the conduit 46B as shown in FIG. 2. The seed sensor 50 measures the number of seeds or rate of seeding (i.e., number of seeds per time increment) from the singulating meter 22 and the bypass conduit 26 around the singulating meter 22. This information can be stored and relayed from a control unit to an operator for quality assurance. The conduit 46B provides a path for the singulated seeds to reach the ground and may be in the form of a tube, hollow shaft, channel, belt, or similar means of conveyance suitable to transfer seed, fertilizer, or other agricultural particles to the ground. More specifically, the conduit 46B may deposit or plant the seeds in a furrow created by one of the ground openers 29B (FIG. 1), such as a seed shank. In other constructions, the opener may include one or two opener disks.

A number of control valves 28A-28C are provided in the system 10. The control valves 28A-28C may be diverter valves or proportional valves and can vary in operation from a fully open position (i.e., providing no additional metering) to a fully closed position (i.e., allowing no seeds to pass) and may be held at various amounts between fully open and fully closed. Alternatively, one or more of the control valves 28A-28C may switch only between the fully open position and the fully closed position with no intermediate positions. When in other than a fully closed position, the control valves 28A-28C allow passage for at least some of the air and/or seeds. As shown, FIG. 2 is a schematic and the system 10 need not include all valves 28A-28C.

The second and third conduits 49, 53 share a common origin at the second fan 37B. Therefore, a Y-joint or branch 72 separates the airflow from the fan 37B between each line 49, 53. The air control valve 28A is operably located at the branch 72 upstream of the outlets of the volumetric meters 14B, 14C. The valve 28A is operable to direct an amount or percentage of the total amount of air produced by the fan 37B towards the lines 49, 53.

From the seed storage tank 18C, the seeds may be dispersed via the second or the third dispersion unit 40B, 42. The dispersion valve 28B is operable to change the path taken by the seeds between the second and third conduits 49, 53. When in a first position, the dispersion valve 28B provides a path which connects the third volumetric meter 14C to the second conduit 49, allowing the seeds to mix with the fertilizer in the second conduit 49 upstream of the second dispersion unit 40B. When in a second position, the dispersion valve 28B provides a path from the third volumetric meter 14C to the third dispersion unit 42 through the third conduit 53. The dispersion valve 28B may in some applications be embodied as a switching valve configured to open one path while simultaneously closing the other. Alternatively, both paths of the dispersion valve 28B may be closed to prevent the seed from reaching either dispersion unit 40B, 42.

Bypass valve 28C is located downstream of the third dispersion unit 42 and may function in place of or in addition to the valve 28B. From the third dispersion unit 42, the seeds travel through the secondary conduit 36C towards the mini-hopper 38 and singulating meter 22. However, when the bypass valve 28C is in a first position, the mini-hopper 38 and singulating meter 22 are bypassed and the seed instead mixes with the fertilizer and continues to the ground via the conduit 46B. When the bypass valve 28B is in a second position, the seed continues to the mini-hopper 38, singulating meter 22, and to the ground via the second outlet conduit 46B.

Referring to FIG. 2, the first storage tank 18A holds fertilizer. In operation, when actuated, the first volumetric meter 14A rotates to allow a known, but variable rate of fertilizer to exit the tank 18A and deposits the fertilizer in the conduit 45. The fertilizer enters the first conduit 45 which is concurrently supplied with airflow from the first fan 37A. The airflow carries the fertilizer within the first conduit 45 to the first dispersion unit 40A, which disperses the fertilizer amongst multiple secondary conduits 36A. Each secondary conduit 36A carries the fertilizer to the conduit 46A and deposits the fertilizer in a furrow created by the ground opener 29A such as a fertilizer shank (FIG. 1).

The second storage tank 18B also holds fertilizer. In operation, when actuated, the second volumetric meter 14B rotates to allow a known rate of fertilizer to exit the tank 18B at a known rate which may be varied. The fertilizer enters the second conduit 49, which is concurrently supplied with airflow from the second fan 37B. The airflow carries the fertilizer within the second conduit 49 to the second dispersion unit 40B, which disperses the fertilizer amongst multiple secondary conduits 36B. Each secondary conduit 36B carries the fertilizer to the conduit 46B and deposits the fertilizer in a furrow created by the seed shank 29B, separate from the fertilizer in the furrow created by the fertilizer shank 29A. For example, the fertilizer from the first tank 18A may be deposited between two adjacent seed furrows.

The third storage tank 18C holds seeds. When the third volumetric meter 14C is actuated, it rotates to allow a known amount of seeds to exit the tank 18C at a known rate. The valve 28B directs the seed in one mode to conduit 49 supplied with airflow from the second fan 37B where the seed mixes with fertilizer from tank 18B and is then conveyed pneumatically to the seed shank 29B as described above. In a second mode, the valve 28B directs seed into the third conduit 53 which is concurrently supplied with airflow from the second fan 37B. The airflow carries the seeds within the third conduit 53 to the third dispersion unit 42. The seeds enter the inlet 48 of the third dispersion unit and fall towards the sloped base 54, where they pool in the central chamber 44 above the orifice 56. The seeds eventually pass through the orifice 56 into the seed channel 60 but if the seed channel 60 below the orifice 56 is full, additional seeds are not capable of entering the seed channel 60 from the central chamber 44. Concurrently, the air that previously carried the seeds through the inlet 48 continues through the air outlet 62 and to the first end 66 of the seed channel 60 to carry the seeds in the seed channel 60 out of the second end to the secondary conduit 36C in a controlled manner.

The volumetric meter 14C and associated gate 16 permit seeds into the main conduit 53 and the central chamber 44 of the third dispersion unit 42 at a rate greater than the seeds exit the seed chamber 60. Therefore, seeds may back up within the central chamber 44. When the seeds accumulate to a level measured by the upper limit sensor 44A, the sensor relays a signal to the control unit (not shown) which in response actuates the associated gate 16 into a closed position, thereby stopping flow of the seeds into main conduit 53. As the seeds continue to pass through the orifices 56 leading to the seed channels 60 and the secondary conduits 36C, the level of seeds within the central chamber 44 decreases until the lower limit sensor 44B relays a signal that the number of seeds within the central chamber is at or below a lower limit. The signal is relayed to the control unit which actuates the gate 16 into an open position, thereby resuming the flow of the seeds from the third storage tank 18C.

The seed from the secondary conduit 36C may be singulated via the singulating meter 22, or may be planted without further metering. If the bypass valve 28C is in a first position, the singulating meter 22 is bypassed and the seeds from the secondary conduit 36C bypass the meter 22 but join to the meter outlet upstream of the seed sensor 50. If the bypass valve 28C is in a second position, the seed is fed to the mini-hopper 38 and then from there to the meter 22 where the seed is singulated before passing the seed sensor 50 and being deposited into the ground.

When the mini-hopper 38 reaches the maximum fill height, the openings 70 within the mini-hopper 38 are blocked by the seeds. In turn, the air within the associated secondary conduit 36C is unable to vent through the openings 70, thereby increasing the air pressure within the secondary conduit 36C and preventing further passage of seeds into the mini-hopper 38. If the seed level within the mini-hopper 38 drops below the maximum fill height, the openings 70 clear, permitting the free passage of air through the openings 70 and further carrying of additional seeds to the mini-hopper 38.

Various features of the disclosure are set forth in the following claims.

What is claimed is:

1. A seeding system comprising:
a storage tank operable to store a plurality of seeds;
a dispersion unit configured to disperse some of the plurality of seeds from the dispersion unit amongst a plurality of conduits, the dispersion unit including a sensor; and
a meter operable to transfer the some of the plurality of seeds from the storage tank to the dispersion unit,
wherein the sensor is operable to produce a signal to control the transfer from the storage tank to the dispersion unit.

2. The seeding system of claim 1, further comprising a gate operable to transition between an open position and a closed position in response to a signal from the sensor, wherein in the closed position the gate restricts the transfer of seeds from the storage tank to the dispersion unit.

3. The seeding system of claim 2, wherein the sensor is a first sensor and further comprising a second sensor, wherein the gate is operable to transition to the open position in response to a signal from the second sensor.

4. The seeding system of claim 1, further comprising:
a fan configured to produce an air current upstream of the dispersion unit to transfer seeds from the meter to the dispersion unit; and
a container associated with one of the plurality of conduits and configured to receive the seeds dispersed to the one of the plurality of conduits,
wherein the container includes at least one orifice sized to prohibit seed passage through the at least one orifice, and
wherein, when not obstructed by a portion of the seeds dispersed to the one of the plurality of conduits, the at least one orifice is operable as an outlet for the air current from the fan.

5. The seeding system of claim 4, wherein, when obstructed by a portion of the seeds dispersed through the one of the plurality of conduits, the at least one orifice is operable to limit or reduce the air current from the fan through the one of the plurality of conduits.

6. The seeding system of claim 1, wherein each one of the plurality of conduits is configured to pass seed to a singulating meter.

7. A seeding system comprising:
a dispersion unit configured to disperse a plurality of seeds amongst a plurality of seed conduits, the dispersion unit comprising a container having an inlet for the plurality of seeds and an air current, at least one seed outlet, and an air outlet distinct from the at least one seed outlet;
a single fan located upstream of the inlet of the dispersion unit and operable to provide the air current to the inlet of the dispersion unit; and
a seed channel with a first end and a second end, the channel configured to receive a portion of the plurality of seeds from the at least one seed outlet,
wherein the first end is configured to receive the air current from the air outlet, and
wherein the second end is configured to deliver the portion of the plurality of seeds and a portion of the air current to a singulating meter.

8. The seeding system of claim 7, wherein the air current which conveys the plurality of seeds through the inlet of the container is configured to convey the plurality of seeds through the second end of the seed channel.

9. The seeding system of claim 7, further comprising:
a sensor located within the container;
a meter operable to transfer the plurality of seeds from a storage tank to the dispersion unit; and
a gate operable to transition between an open position and a closed position in response to a signal from the sensor, wherein in the closed position the gate restricts the transfer of seeds from the storage tank to the dispersion unit.

10. The seeding system of claim 7, further comprising:
a storage tank operable to store the plurality of seeds upstream of the dispersion unit; and
a second storage tank operable to store an amount of fertilizer,
wherein the single fan is operable to provide an air current to transfer some of the amount of fertilizer.

11. The seeding system of claim 7, further comprising:
a second container associated with one of the plurality of seed conduits and configured to receive the seeds dispersed to the one of the plurality of seed conduits,
wherein the container includes at least one orifice sized to prohibit seed passage through the at least one orifice,
wherein, when not obstructed by a portion of the seeds dispersed to the one of the plurality of conduits, the at least one orifice is operable as an outlet for the air current from the fan.

12. The seeding system of claim 11, wherein, when obstructed by a portion of the seeds dispersed to the one of the plurality of conduits, the at least one orifice is operable to limit or reduce the air current from the fan.

13. A seeding system comprising:
a first storage tank for holding a plurality of seeds;
a second storage tank for holding a quantity of fertilizer;
a plurality of singulating meters, each operable to meter some of the plurality of seeds from the first storage tank;
a first path operable to deliver a first portion of the plurality of seeds from the first storage tank to one of the plurality of singulating meters via a first dispersion unit, the first dispersion unit including a sensor configured to sense a relative quantity of seed within the first dispersion unit; and
a second path operable to deliver a portion of the quantity of fertilizer from the second storage tank to the ground via a second dispersion unit,
wherein the second path is configured to bypass the one of the plurality of singulating meters.

14. The seeding system of claim 13, further comprising a third storage tank for holding a second quantity of fertilizer and a third path operable to deliver a portion of the second quantity of fertilizer from the third tank to the ground via a third dispersion unit.

15. The seeding system of claim 14, wherein the first path and the second path are in fluid communication with a first fan, and wherein the third path is in fluid communication with a second fan.

16. The seeding system of claim 13, further comprising a fan, wherein the first path and the second path are operable to deliver the first portion of the plurality of seeds and the portion of the quantity of fertilizer via an air current from the fan.

17. The seeding system of claim 13, further comprising a first volumetric meter and a second volumetric meter, wherein the first volumetric meter is operable to meter the first portion of the plurality of seeds and the second volumetric meter is operable to meter the portion of the quantity of fertilizer.

18. A seeding system comprising:
- a first storage tank for holding a plurality of seeds;
- a second storage tank for holding a quantity of fertilizer;
- a plurality of singulating meters, each operable to meter some of the plurality of seeds from the first storage tank;
- a first path operable to deliver a first portion of the plurality of seeds from the first storage tank to a point downstream of a second dispersion unit; and
- a second path operable to deliver a portion of the quantity of fertilizer from the second storage tank to the ground via the second dispersion unit,
- wherein the first path is in communication with the second path at the point downstream of the second dispersion unit.

19. The seeding system of claim 18, wherein the first path is configured to bypass the plurality of singulating meters.

20. The seeding system of claim 18, further including a first dispersion unit within the first path, the first dispersion unit including a sensor configured to sense a relative quantity of seed within the first dispersion unit.

21. The seeding system of claim 18, further comprising a fan, wherein the first path and the second path are operable to deliver the portion of the quantity of fertilizer and the first portion of the plurality of seeds via an air current from the fan.

22. The seeding system of claim 18, further comprising a first volumetric meter and a second volumetric meter, wherein the first volumetric meter is operable to meter the portion of the quantity of fertilizer and the second volumetric meter is operable to meter the first portion of the plurality of seeds.

23. The seeding system of claim 18, wherein the second path is further operable to deliver a second portion of the quantity of fertilizer from the second tank and a second portion of the plurality of seeds from the first storage tank to the ground via the second dispersion unit.

24. The seeding system of claim 23, further comprising a fan, wherein the first path and the second path are operable to deliver the second portion of the quantity of fertilizer, the first portion of the plurality of seeds, and the second portion of the plurality of seeds via an air current from the fan.

* * * * *